US010326894B1

United States Patent
Heller et al.

(10) Patent No.: US 10,326,894 B1
(45) Date of Patent: *Jun. 18, 2019

(54) SELF STABILIZING PROJECTOR

(71) Applicant: Amazon Technologies, Inc., Seattle, WA (US)

(72) Inventors: Geoffrey Scott Heller, Seattle, WA (US); Chang Yuan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,642

(22) Filed: Dec. 8, 2017

Related U.S. Application Data

(63) Continuation of application No. 13/957,191, filed on Aug. 1, 2013, now Pat. No. 9,843,689.

(51) Int. Cl.
| | |
|---|---|
| *H04N 1/00* | (2006.01) |
| *H04N 9/00* | (2006.01) |
| *H04N 9/31* | (2006.01) |
| *H04M 1/02* | (2006.01) |

(52) U.S. Cl.
CPC ...... *H04N 1/00267* (2013.01); *H04M 1/0272* (2013.01); *H04N 9/00* (2013.01); *H04N 9/31* (2013.01); *H04N 9/3173* (2013.01); *H04N 9/3194* (2013.01)

(58) Field of Classification Search
CPC ........ H04N 1/00267; H04N 9/00; H04N 9/31; H04N 9/3173; H04N 9/3185; H04N 9/3194; H04M 1/0272; H04M 2250/52; G01B 11/24; G01B 11/2513
See application file for complete search history.

(56) References Cited

U.S. PATENT DOCUMENTS

| | | | |
|---|---|---|---|
| 7,857,460 B2 | 12/2010 | Klosowiak et al. | |
| 7,916,376 B2 | 3/2011 | Yu et al. | |
| 9,129,375 B1 | 9/2015 | Liu et al. | |
| 2004/0222987 A1 | 11/2004 | Chang et al. | |
| 2009/0190046 A1 | 7/2009 | Kreiner et al. | |
| 2009/0309826 A1 | 12/2009 | Jung et al. | |
| 2012/0194517 A1 | 8/2012 | Izadi et al. | |

OTHER PUBLICATIONS

Office action for U.S. Appl. No. 13/957,191, dated Feb. 5, 2016, Heller et al., "Self Stabilizing Projector", 14 pages.
Office action for U.S. Appl. No. 13/957,191, dated Sep. 8, 2016, Heller et al., "Self Stabilizing Projector", 15 pages.

*Primary Examiner* — Anner N Holder
(74) *Attorney, Agent, or Firm* — Lee & Hayes, P.C.

(57) ABSTRACT

A mobile device for projecting images on a surface and for maintaining a position of the image on the surface. The device including an image rendering module to scan the surface and to modify the image based on data obtained about a three dimensional nature of the surface. The device further including an optical image stabilization to adjust an alignment of the projector based on orientation data of the device, an electronic image stabilization module to shift the image within a projection area based on the orientation data and an image-tracking module to shift the image within the projection area based on changes in a relative positions of the image and a target.

20 Claims, 6 Drawing Sheets

SELF STABILIZING PROJECTOR

CROSS REFERENCE TO RELATED APPLICATION

This patent application is a continuation of co-pending, commonly owned U.S. patent application Ser. No. 13/957, 191 filed Aug. 1, 2013, entitled "SELF STABILIZING PROJECTOR", the entirety of which is hereby incorporated by reference.

BACKGROUND

More and more people continue to use computing devices to interact with their environment in ever increasing ways. Many devices now provide users with the ability to record or scan information and data from the environment. Typically, these devices allow the users to transmit the information and data to and receive related information from remote servers and/or other computing devices almost instantaneously. Some mobile devices also allow users to scan an environment and display information related to the environment to the user in response.

Whether the user of the computing device relates to capturing, retrieving or displaying information, users expect a more seamless and instantaneous experience when interacting with their environment and/or interfacing with the large amounts of data available to the devices via the remote servers. One of the challenges with using a computing device to interact directly with an environment is limited display size of mobile devices, which often results in disconnecting the user from environment rather than enhancing the relationship.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Overview

Figure 1:
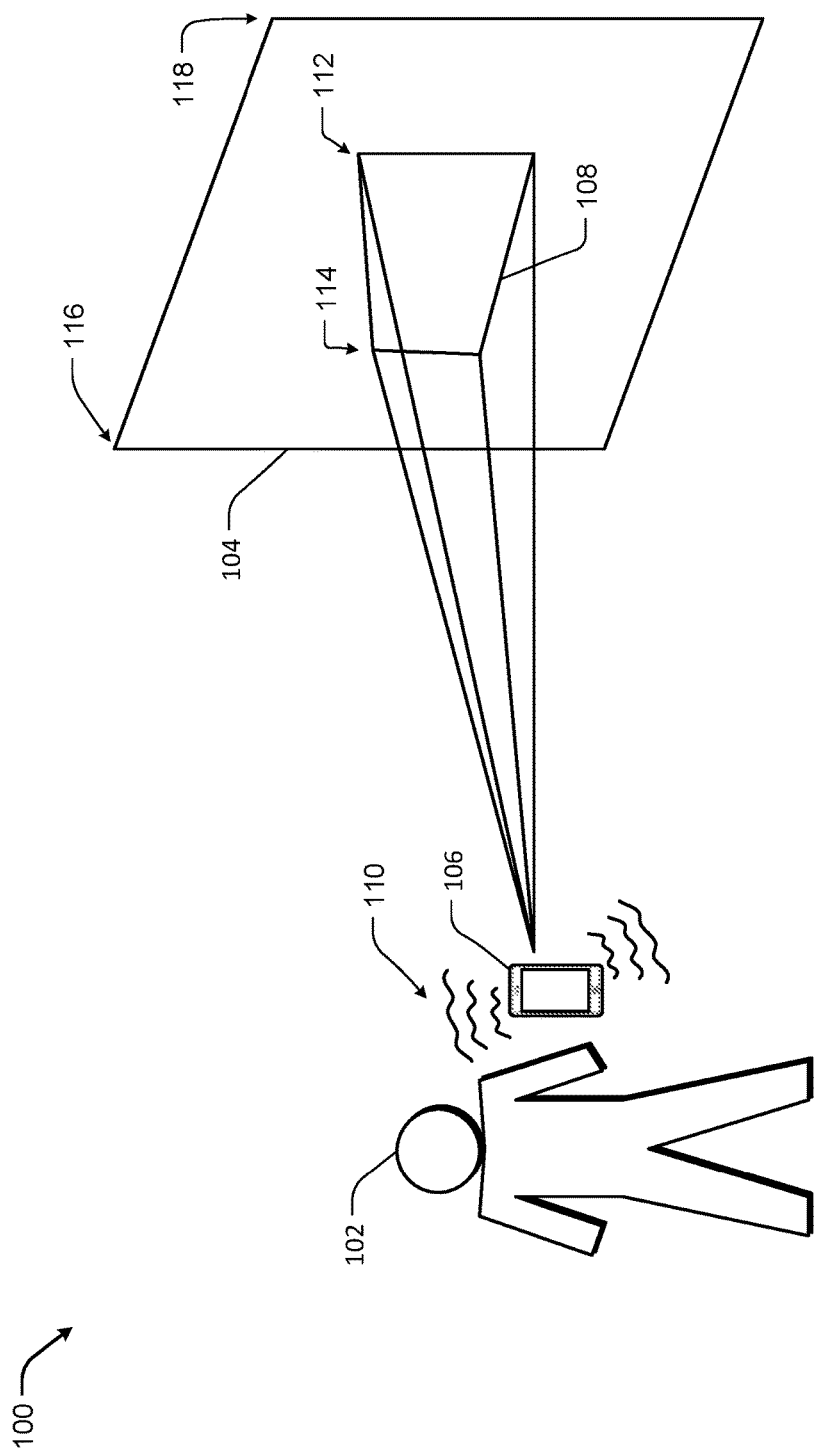
FIG. 1 illustrates an example environment including a user holding a mobile device that projects content onto a surface.

This disclosure includes techniques and implementations to improve user interaction with an environment via a mobile or handheld device. In particular, this disclosure describes a mobile device including a projector system for projecting information related to objects within the environment adjacent to, on top of, or in conjunction with the objects and/or a related surface. For instance, the mobile devices, described herein, are configure to identify a surface within the environment on which to project an image, project the image onto the surface and maintain the position of the image relative to the surface during the length of the projection.

In general, before projecting an image, the mobile device identifies a surface from within the environment on which to project. Unfortunately, surfaces within an environment are often not flat or uniform. Instead, surfaces typically contain variations or distortions, which lead to a perceived degradation in images projected thereon. For example, the surface may contain changes in depth, curvatures, obstructions, protrusions, as well as both foreground and background objects.

To compensate for the variations, the mobile device may be configured with a time-of-flight camera to resolve distances between the mobile device and the surface. For instance, time-of-flight cameras are configured to determine a distance to a surface by measuring the time it takes for light emitted from the mobile device to travel from the mobile device, to a point on the surface, and back to the mobile device. In another example, structured-light techniques may be utilized to map the depth, orientation and contours of the surface. In this example, a pattern (often a grid or a series of horizontal bars) is projected onto the surface and the mobile device determines the depth, orientation and contours of the surface based on the way that the pattern is deformed by the contour of the surface. In some specific instances, differing patterns may be alternatively projected on the surface at extremely high frame rates in order to obtain the depth information.

In other implementations, the mobile device may be equipped with multiple cameras, stereo cameras, or light field cameras, which together with computer vision technology may be utilized to obtain the three dimensional nature of the surface including the depth, orientation and contours of a surface. Various other technologies may also be utilized to map the three dimensional nature of the surface. For instance, aperture coding or wave front coding may be utilized.

Once the depth, orientation and contour information is obtained and the surface mapped, the mobile device may be configured to render the image to be projected in such a way as to remove any distortion in the projection as viewed from the location of the mobile device. For example, if a first area of the surface is a greater distance from the mobile device than a second area of the surface, the image projected on the first area may be on a larger scale than the portion projected on the second area. In another example, the image may only be projected on foreground objects or only on background objects. In one particular example, the surface may be a sphere and the mobile device may render the image using the correct spherical adjustments to optimize the display based on the depth, orientation and contour information. For instance, the mobile device may project an image of the globe onto the sphere, such that the landmasses appear to the user in the correct location, orientation and size.

In one particular implementation, the mobile device may be configured to determine additional information related to the surface, in addition to the depth, orientation and contours. For example, the mobile device may be configured to determine a color or color gradient of the surface. Once the color information is determined, the mobile device may further modify the image to blend naturally with the surface and/or merge with the colors of the surface, such that the image appears to the user in the colors of which the image is intended to be viewed.

In some implementations, the mobile device may also be configured to detect specific information or objects within the environment and to project information related to the objects upon the surface. For example, the mobile device may be configured to read a phone number from an advertisement and to project information related to the phone number (such as the holder's name, the state associated with the area code, a business associated with the number, etc.) adjacent to the number. In another example, the mobile device may be configured to scan a QR code or a bar code and to project information related to the QR or bar code (such as product name, product price at one or more merchants, product reviews, etc.) onto the surface in response. In one particular example, the mobile device may determine information related to the object of interest, such as a font of the phone number, and to display the information related to the object in the same font.

Once the image is projected on the surface, the mobile device maintains the position of the projection on the surface. Typically, the mobile device is utilized in a hand-held position, while projecting information to the user. However, the mobile device often experiences vibrations and/or small movements due to the user being unable to hold the mobile device perfectly still. If the mobile device is unable to compensate for the vibrations, the projection vibrates and shakes accordingly, resulting in a reduced user experience. To compensate for the vibrations, in various implementations, the mobile device is equipped with an optical image stabilization (OIS) module, an electronic image stabilization (EIS) module, an image-tracking module and/or a combination thereof.

OIS is a technique to compensate for vibrations and small movements by realigning (adjusting) tip and tilt (yaw and pitch) of the projector or a lens of the projector relative to the mobile device in the opposite direction of any detected movement, such that the projected image remains within the desired area of the surface. For example, the OIS module may include a magnetic coil or actuator connected to each corner of the lens or the projector module. An OIS module then receives orientation or motion data from inertial sensors, which may include by way of example one or more gyroscopes and/or one or more accelerometers, within the mobile device and based on the motion data uses the magnetic coils to adjust the position of the projector.

EIS is another technique to compensate for vibrations and small movements by digitally adjusting the image within an available projection area in response to the motion data generated by the inertial sensors, such that the projected image remains generally stable on the projection surface. For instance, the mobile device may be equipped with a projector that is capable of projecting over a larger area than is required to project the image and an EIS module may shift the image or video within the larger area (i.e., an available projection window) to compensate for the vibrations. Thus, the EIS module is configured to cause the image (or a sub-region of the image) to move in the x and/or y direction within the larger projection area to maintain the position of the image on the surface. For example, if the mobile device is moved to the right, the EIS module may cause the image to move to the left to compensate.

In one particular example, if the image is 1920 pixels by 1080 pixels (e.g., 1080p resolution) and the projector utilized by the mobile device is configured to produce an image of 2100 pixels by 1200 pixels, the EIS module may utilize the pixels outside the border of the visible image (i.e., the 180 pixels by 120 pixels surrounding the image) to provide a buffer in which to shift the projected image. For instance, the EIS module may reframe the image in accordance to data from the inertial sensors so that in the resultant image, appears substantially stable and does not jump around due to shaking of the mobile device. In other words, if the image uses a certain subset of the pixels of the larger projection area, and if there is a movement of the mobile device, the EIS module may select a different subset of pixels within the larger projection area to project in order to stabilize the image on the surface.

Image tracking is yet another technique to compensate for vibrations and small movements of the mobile device. Generally, image-tracking systems monitor a target, such as an object that is within the environment and that relates to the projected image (e.g., a phone number or word on a wall or even an object on which the mobile device is projecting). For instance, an image-tracking module may monitor the projected image in regards to the stationary target and adjust the projected image in response to detecting a change in distance between the projection and the target.

In another instance, the image-tracking module may monitor movement of an item within the image. In this instance, the target is the item within the image, for example, the edge of the projected image frame or a background item (such as a tree or shrub). In this manner, the image-tracking module is able to detect movement of the item from frame to frame and to compensate by adjusting the projected image accordingly.

In some implementations, OIS, EIS and image tracking techniques may be used in combination to maintain the position of the projection relative to the surface. For example, the OIS module and the EIS module may adjust the projection in real time based on gyroscope and accelerometer data, while the image-tracking module utilizes the adjustment data generated by the OIS and EIS modules to maintain the relative position of the projection with respect to a stationary target. Thus, a mobile device is described herein which is capable of identifying and mapping a three dimensional surface, projecting an image on the surface such that the image does not appear disproportional on the surface. The mobile device is also capable of compensating for vibrations associated with hand-held projector systems by maintaining the position of the projected image relative to the surface once the image is projected.

Illustrative Environment

FIG. 1 illustrates an example environment 100 including a user 102 projecting onto a surface 104. In the illustrated example, the user 102 is holding the mobile device 106, while causing the mobile device 106 to project an image 108 onto the surface 104. Because the user 102 is holding the mobile device 106, the mobile device 106 experiences some small amount of vibration, generally indicated by 110, or instability due to the fact that the user 102 is unable to hold the mobile device 106 perfectly still.

In addition, even though the surface 104 is relatively flat, the surface 104 may be considered non-uniform from the perspective of the mobile device 106, as the device 106 is not projecting image 108 onto the surface 104 from a perpendicular angle. Rather, as can be seen from the illustrated environment 100, the user 102 is holding the device 106 such that the device 106 projects the image 108 onto the surface 104 at roughly a forty five degree angle, which typically causes the image 108 to appear distorted to the user 102. Therefore, as shown in the illustrated example, the image 108 projected by the mobile device 106 is larger at a first end 112 than at a second end 114, such that the image 108 appears in correct proportions to the user 102 holding the mobile device 106.

To determine the ratio of the image 108, the mobile device 104 is configured with a time-of-flight camera or utilizes structured light to first determine the depth, orientation and contours of the surface 104. For instance, a pattern (often a grid or a series of horizontal bars) is projected on the surface 104 by the mobile device 106 from the position of the user 102. By capturing images of the pattern on the surface 104 and utilizing the images to measure how the pattern is distorted by the surface 104, the mobile device 104 is able to determine the depth, orientation and contours of the surface 104. In some specific cases, differing patterns may be alternatively projected on the surface 104 to map the surface 104. In the illustrated example, the mobile device 106 is able to determine (e.g., via structured light, a time-of-flight camera, or other depth-sensing techniques) that the surface 104 is at an angle, such that the left side of the surface 104, generally indicated by 116, is closer to the user 102 than the right side of the surface 104, generally indicated by 118.

Once the device 106 determines the depth of the surface 104, the mobile device 106 adjusts the projected image 108 to cause the image 108 to appear correctly on the surface 104 from the position of the user 102. In this example, the mobile device 106 modifies the image 108 to cause the first end 112 to project larger than the second end 114, (i.e., the right side of the image 108 is larger than the left side of the image 108), such that the image 108 appears correctly to the user 102.

In addition to rendering the image 108 for the particular features of the surface 104 and the relative position of the user 102, the mobile device 106 adjusts the projected image 108 in such a way as to compensate for the vibrations 110 caused by the user 102. In this way, the mobile device 106 maintains a stable position of the image 108 on the surface 104 to provide a clear and enjoyable experience for the user 102. In various particular implementations, the mobile device 106 is equipped with an OIS module, an EIS module, an image-tracking module and/or a combination thereof to maintain the position of the image 108 on the surface 104.

The OIS module includes a magnetic coil or actuator coupled to each corner of a lens of the projector of the mobile device 106. The magnetic coils are configured to receive motion data from one more inertial sensors incorporated into the mobile device 106 and to adjust the position of the lens or the entire projector module to compensate for the vibrations 110. While the OIS module utilizes a mechanical correction, the EIS module maintains the position of the image 108 on the surface 104 by manipulating the image 108 digitally. The EIS module causes the image 108 to be projected within a sub-region of the larger projection area and moves the position of the sub-region (i.e., the image 108) within the window to stabilize the projection on the surface 104. The image-tracking module maintains the position of the image 108 on the surface 104 by maintaining a relationship of the image 108 to a target. The target may be an object within the environment or a stationary item within the image.

Figure 2:
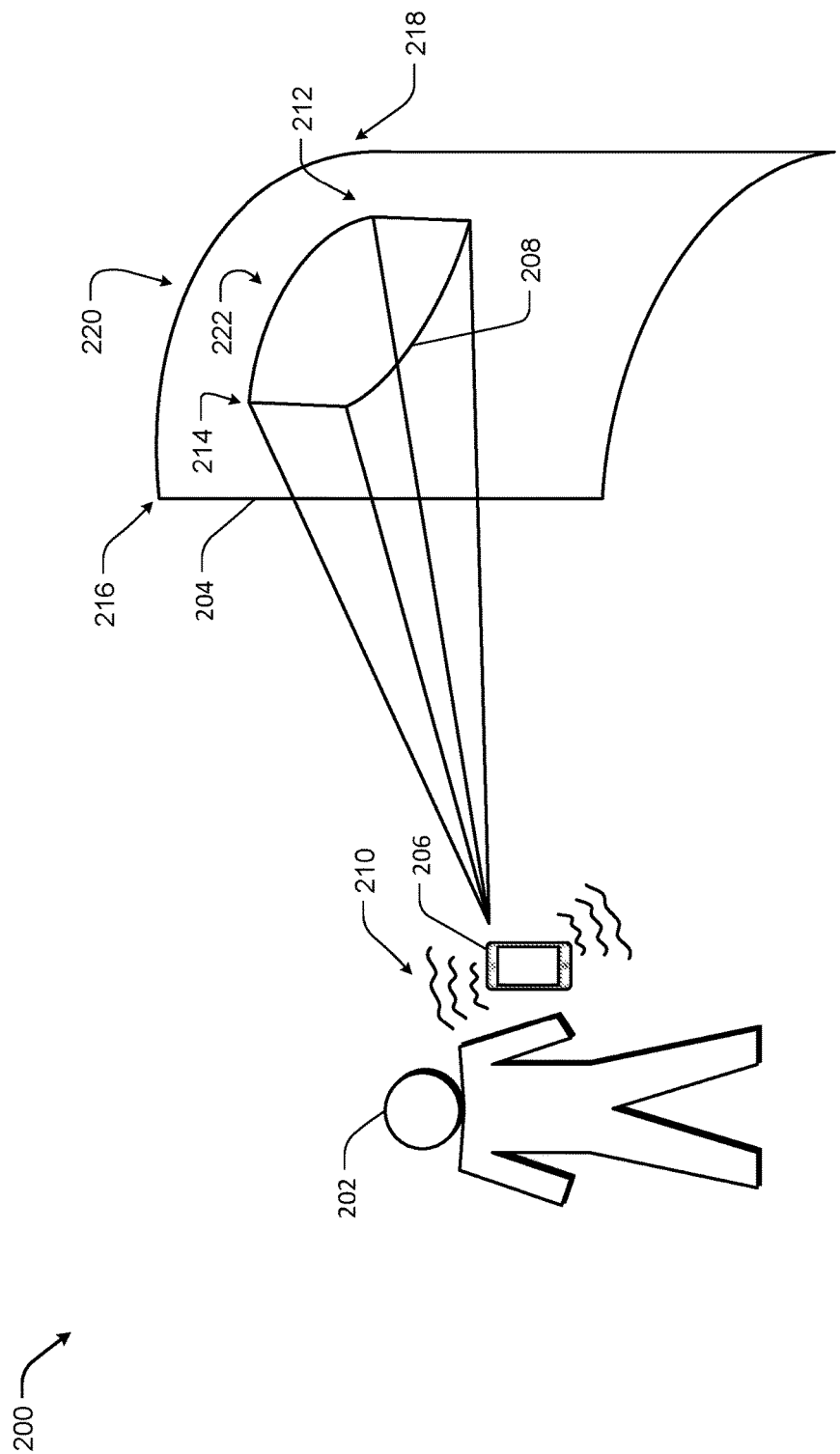
FIG. 2 illustrates another example environment including a user holding a mobile device that projects content onto a surface.

FIG. 2 illustrates another example environment 200 including a user 202 projecting onto a surface 204. In the illustrated example, the user 202 is again holding the mobile device 206, while causing the mobile device 206 to project an image 208 onto the surface 204. The mobile device 206 again experiences some small amount of vibration, generally indicated by 210, or instability due to the fact that the user 202 is unable to hold the mobile device 206 perfectly still.

In this example the surface 204 is again non-uniform. Instead, the surface 204 is concave and provides a curved projection surface. For instance, the left side of the surface 204, generally indicated by 216, and the right side of the surface 204, generally indicated by 218, are closer to the user 202 than the center of the surface 204, generally indicated by 220. Thus, for the projected image 208 to appear correctly to the user 202, the image 208 is projected as larger in the center 222 than at ether a first end 212 or at a second end 214.

As in FIG. 1, the user 202 is holding the mobile device 206, which causes the mobile device 206 to experience some amount of vibration 110 and/or instability. However, because the image 208 is being projected on a surface 204, which is some distance from the user 202, even small vibrations 210 can cause a lever action resulting in much larger vibrations of the image 208 on the surface 204. Therefore, as described above, the mobile device 206 may utilize an OIS module, an EIS module, an image-tracking module and/or a combination thereof to maintain the position of the image 208 on the surface 204.

Figure 3:
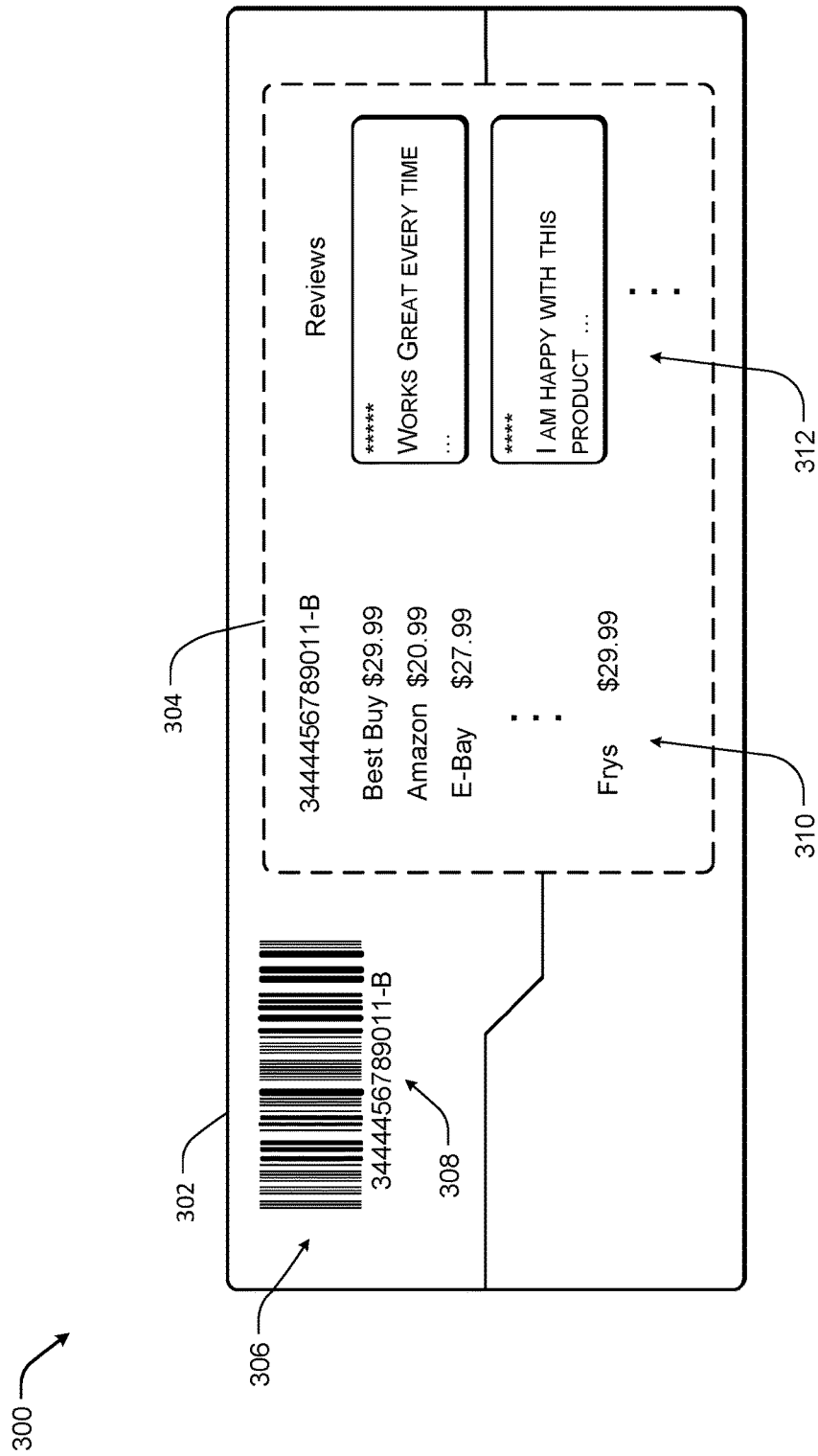
FIG. 3 illustrates an example environment including a projection surface and an image projected thereon.

FIGS. 1 and 2 provide example surfaces to illustrate how the mobile device may project the image in various shapes to compensate for the various depths, orientations and contours of differing projection surfaces. FIG. 3 illustrates an example surface and use for the projected image, which are suitable for the projection capability of the mobile device.

FIG. 3 illustrates an example environment including a projection surface 302 and an image 304 projected thereon. As illustrated, the projection surface 302 is a box 300 including a bar code 306 and a product number 308 representative of an item, which may be purchased by the user. In one particular example, the user may scan the bar code 306 and/or the product number 308 using the mobile device 106 to cause the mobile device 106 to project the image 304 of information related to the item represented by the bar code 306 and the project number 308 onto the box 300 adjacent to the bar code 306 and the product number 308.

In this example, the mobile device is projecting information 310 related to merchants and prices and reviews 312 onto the bottom of the box 300 in response to scanning the bar code 306. In this particular example, the mobile device has also determined the font of the product number 308 and rendered the merchant and price information 310 and the reviews 312 in the same font.

The mobile device is able to project the merchant and price information 310 and the reviews 312 onto such a small projection surface 302 due to the fact that the mobile device is able to maintain the projections position relative to the projection surface 302 and to a target, such as the bar code 306. For example, the mobile device may utilize a combination of OIS, EIS and image tracking to maintain the position of the image 304 on the surface 302. In this example, the OIS and EIS modules receive information from one or more inertial sensors and adjust the image 304 to oppose any movement detected. The OIS and EIS modules may then provide adjustment or position information to the image-tracking module such that the image-tracking module is able to more easily monitor the position of the image 304 with respect to the target (i.e., the bar code 306) and to maintain the relative positioning of the image 304 with respect to the bar code 306.

In one particular implementation, the OIS and EIS modules may be used to correct for jitters or movements of the mobile device, while the image tracking module may be utilized to correct for movements of the projection surface 302. For instance, if the user is holding the mobile device in one hand and the box in the other, both the mobile device and the box may experience movements. While the OIS and EIS modules are configured to adjust for movements of the mobile device based on the inertial sensors, the OIS and EIS modules are unaware of movements of the projection surface 302 and may be unable to maintain the position of the image 304 if the projection surface 302 moves. However, as discussed above, the image tracking module is configured to detect a movement of the box with respect to the target (e.g., the bar code 306) and adjust the position of the image 304 to maintain the position of the image 304 relative to the bar code 306. In this manner, the mobile device is able to maintain a position of an image 304 projected onto a surface 302 even when both the mobile device and the projection surface 302 experience movement.

FIG. 3 provides one example use for the projection system described herein, however in other instances, the projection system may also be configured to capture or scan other data, such as business names, street addresses, signs, maps, advertisements, etc., and to project information related to the data onto a projection surface in a similar manner, as that described above.

In some implementations, the projection system described herein, may be utilized to alter the appearance of an object. For instance, in one example scenario, while the user is shopping, the user may consider purchasing a particular product, such as shoes, clothing or other merchandise, scan the bar code 306 to obtain more information about the particular project and, in the process discover, the that merchandise comes in various patterns or skins, which are not in stock at the user's current venue. In this example, the user may utilize the mobile device to download the patterns or skins, scan the available product to determine the three dimensional nature and to project onto the product in such a way as the user is able to view each of the available patterns or skins on the product in the manner that the product is intended to appear with each pattern or skin.

Illustrative Architecture

Figure 4:
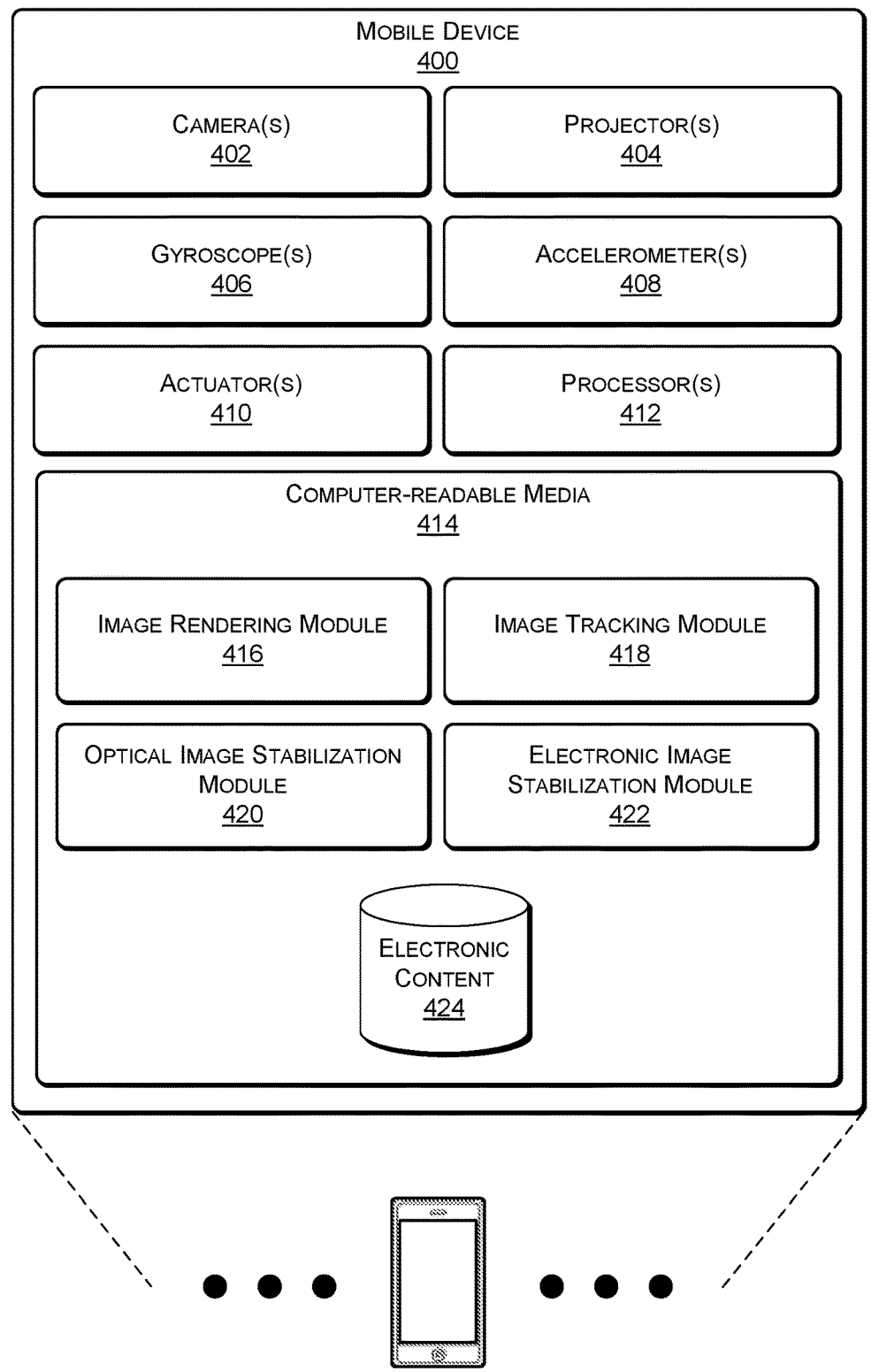
FIG. 4 illustrates an example architecture of a mobile device, such as the mobile devices of FIGS. 1 and 2.

FIG. 4 illustrates an example architecture of a mobile device 400, such as the mobile devices 106 and 206 of FIGS. 1 and 2. The mobile device 400 may include one or more cameras 402 to capture information about a projection surface, such as depth, orientation and contour data. The one or more cameras 402 may be one or more internal cameras integrated into the mobile device or the cameras 402 maybe one or more external cameras connected to the mobile device 400. Generally, the cameras 402 are configured to either alone or in combination determine three dimensional aspect of a surface. For example, time-of-flight cameras, stereo cameras, light field cameras and/or a combination thereof may be utilized to determine the depth, orientation and contours of a projection surface.

The mobile device also includes one or more projectors 404 to render an image on the surface. In some instances, the projector may project a modified version of the image onto the surface. For example, the mobile device 400 may be configured to distort or otherwise modify the image and/or the projection of the image based on the three dimensional nature of the surface, as captured by the cameras 402, such that the image appears proportionately to the user.

The mobile device 400 also includes one or more inertial sensors. Such as gyroscopes 406 and/or accelerometers 408, to collect data related to movements of the mobile device 400. For example, the gyroscopes 406 may be configured to collect data related to tip and tilt (yaw and pitch) of the mobile device 400, as the mobile device 400 is held in a user's hand, while the accelerometers 408 may be configured to collect data related to horizontal and vertical movements of the mobile device 400. In one implementation, the mobile device may further include a filter (not shown) to filter the data related to movements of the mobile device 400 and to convey the filtered data to one or more systems depending on the amplitude of the vibration.

The mobile device 400 includes one or more actuators 410 configured to receive the motion data from the gyroscopes 406 and the accelerometers 408 and connected to each of the projectors 404, such that the actuators 410 are able to adjust the position, tip and tilt of the projectors 404 to stabilize images being projected onto the surface. In some implementations, the actuators 410 may be any type of component capable of quickly adjusting the position of the projects 404. For example, the actuators 410 may be one or more piezoelectric devices or voice coils (i.e., coils of wires that actuate based on an applied magnetic field). In one specific implementations, each of the projectors 404 are connected to four actuators 410, one located at each corner of the projector 404, such that in combination the actuators 410 are capable of adjusting both the vertical and horizontal position of the projectors 404 (or the lens of the projector 404), as well as, the tip and tilt.

The mobile device 400 includes, or accesses, components such as at least one control logic circuit, central processing unit, one or more processors 412, in addition to one or more computer-readable media 414 to perform the function of the mobile device 400 and or store content items. Additionally, each of the processors 412 may itself comprise one or more processors or processing cores.

Depending on the configuration of the mobile device 400, the computer-readable media 414 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RANI, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 412. Several modules such as instruction, data stores, and so forth may be stored within the computer-readable media 414 and configured to execute on the processors 412, such as an image rendering module 416, an image-tracking module 418, an OIS module 420 and an EIS module 422.

In general, the image rendering module 416 is configured to receive the data captured by the cameras and to cause the processors 412 to determine three dimensional aspects of the surface. The image rendering module 416 is further configured to modify the projected image based on the three dimensional nature of the surface to generate an image that appears undistorted to the user when projected on the surface. In the illustrated example, the image rendering module 416 is shown as instructions stored in computer-readable media 414, however, in other implementations the image rendering module 416 may be realized in hardware. For example, the image rendering module may be implemented using one or more hardware keystones, image shifting system, controlled zooms, various types of lens, or a combination therefore.

The image-tracking module 418 is configured to monitor the position of a target with respect to the projected image and to correct the positioning of the projected image in response to detecting a movement of the image. The OIS module 420 is configured to monitor the motion data collected by the gyroscopes 406 and accelerometers 408 and to cause one or more of the actuators 410 to adjust the position of the projectors 404 (or a lens of the projector) in response. The EIS module 422 is configured to monitor the motion data collected by the gyroscopes 406 and accelerometers 408 and shift the image within a larger projection area to compensate for the movement of the mobile device 400. For instance, the projectors 404 may be configured to project over an area that is 2100 pixels by 1800 pixels and the image may be 1920 pixels by 1080 pixels.

In the illustrated example, the image-tracking module 418, the OIS module 420 and the EIS module 422 are shown as instructions stored in memory. However, in some implementations the image-tracking module 418, the OIS module 420 and the EIS module 422 may be configured as stand-alone modules or circuits. In one particular implementation, one or more of the image-tracking module 418, the OIS module 420 and the EIS module may be incorporated into a projector module including the projectors 404, as well as, the gyroscopes 406 and/or the accelerometers 408.

The computer-readable media 414 may also store electronic content 424, such as games, music, movies, books, periodicals, among others, which may be rendered on the surface by the projectors 404. In some implementations, the mobile device 400 may also include one or more communication interfaces (not shown) for downloading or retrieving electronic content 424 from one or more networks and/or cloud services.

In general, a user of the mobile device 400 selects a surface onto which to project an image, such as a wall or other object within the user's environment. The user selects the surface by causing the cameras 402 to capture data related to the three dimensional nature of the surface and to provide the data to the image rendering module 416. For example, if the cameras 402 include a time-of-flight camera the three dimensional nature of the surface may be determined by measuring the time a light signal travel between the mobile device 400 and the surface for each point of the image. In another example, the projectors 404 may project a pattern onto the surface and the cameras 402 may capture imagery of the surface, while the pattern is projected on the surface.

The image rendering module 416 modifies the image based on the information captured by the cameras 402. For instance, if the surface is at an angle, the image rendering module 416 may cause a portion of the image to be projected in a larger scale to compensate. In another instance, the surface may be a ball onto which the mobile device 400 is projecting. In this example, the image rendering module 416 may cause the projection to be larger around the edges to accurately represent the image to the user. In one particular instance, the image rendering module 416 may also determine the color and shading associated with the surface from the captured data and to modify the coloring and/or lighting of the image to be projected to cause the colors and/or shading of the images to appear as desired when projected onto the surface. For example, the image rendering module 416 may be utilized to generate an image which when projected onto an object in front of the projection surface camouflages the object and causes the object to blend into the surface.

Once the image rendering module 416 has modified the image to reduce distortion caused by the non-uniform projection surface, the projectors 404 project the modified image onto the surface. While the image is being projected, the mobile device 400 is likely to experience some amount of vibration and/or movement due to the mobile device 400 being held in the hand of the user. To compensate for the vibrations, in various implementations, the mobile device 400 utilizes the OIS module 420, the EIS module 422 and/or the image-tracking module 418.

For instance, OSI module 420 may be configured to receive motion data from the gyroscopes 406 and the accelerometers 408 and, in response, to cause the actuators 410 to adjust the position of the lenses of the projectors 404. For example, if the user tilts the mobile device 400 downward, the downward motion would be captured in part by the gyroscopes 406 and in part by the accelerometers 408. The gyroscopes 406 and the accelerometers 408 provide data related to the downwards motion to the OIS module 420, which calculates an adjustment in the opposite direction (in this example, an upward tilt) for the projectors 404 (or the lenses) to maintain the position of the image on the surface. Thus due to the quickness with which the gyroscopes 406, the accelerometers 408 and actuators 410 can detect and respond to movement, the OIS module 420 is able to largely compensate for movement of the mobile device 400, such that the image being projected appears stable on the surface.

In various implementations, the EIS module 422 may be utilized in addition to or in lieu of the OIS module 420, to compensate for vibrations and small movements of the mobile device 400. Similar to the OIS module 420, the EIS module 422 also receives motion data, as captured by the gyroscopes 406 and the accelerometers 408. However, unlike the OSI module 420, the ESI module 422 compensates for movements of the mobile device 400 by adjusting the projected image within a larger area in which the projector is capable of rendering images, such that the projected image remains stable on the surface. For example, the EIS module 422 may cause the image to be output in a sub-region of a possible projection area and move the sub-region in the x and/or y direction within the larger projection area to maintain the position of the projected image on the surface.

In a particular implementation, a filter (not shown) connected to the gyroscopes 406 and accelerometers 408 may convey data associated with movements within a first amplitude to the OIS module 420 but data associated with movements within a second range of amplitude to the EIS module 422. In other implementations, the movements corrected by the OIS module 420 may be blocked from correction using the EIS module 422, as to not overcompensate. For example, the EIS module 422 may include firmware that can determine that movements within a threshold range are to be handled by the OIS module 420 and cause the EIS module 422 to correct for the portions of the movement that are outside of the threshold range.

In some implementations, the image-tracking module 418 may also be used to stabilize the projected image on the surface. In general, the image-tracking module 418 monitors the movement of the image with respect to a stationary target and adjust the position of the image with respect to the target. For example, the mobile device 400 may be configured to continuously or periodically capture imagery of the surface and to provide the imagery to the image-tracking module 418, the image-tracking module 418 is able to detect and track the target relative to the projected image and to adjust the position of the projectors 404 and/or digitally adjust the position of the image within the projection window to compensate for any detected movement.

In another implementation, the image-tracking module 418 may maintain the position of the projected image on a surface by tracking a target from within the image projected on the surface. In this implementation, the cameras 402 capture imagery of the surface, including the projected image, and feed the imagery to the image-tracking module 418, which in turn detects movement of the target and adjusts the projected image in response. For example, one possible algorithm for tracking a target within the projected image is the tracking, learning, detection (TLD) algorithm.

In one particular implementation, the image-tracking module 418 is configured to work in conjunction with either the OIS module 420, the EIS module 422 or both. In this implementation, the OIS module 420 and the EIS module 422 maintains the position of the image with respect to the surface based on the data received from the gyroscopes 406 and the accelerometers 408. The OIS module 420 and the ESI module 422 provide data related to the respective adjustments to the image-tracking module 422, such that the image-tracking module 422 is able to track the target by searching a much smaller area of the captured imagery. In this way, the OIS module 420 and the EIS module 422 are able to compensate for instability on a first level and the image-tracking module 418 is able to compensate for the instability on a second level.

Illustrative Processes

Figure 5:
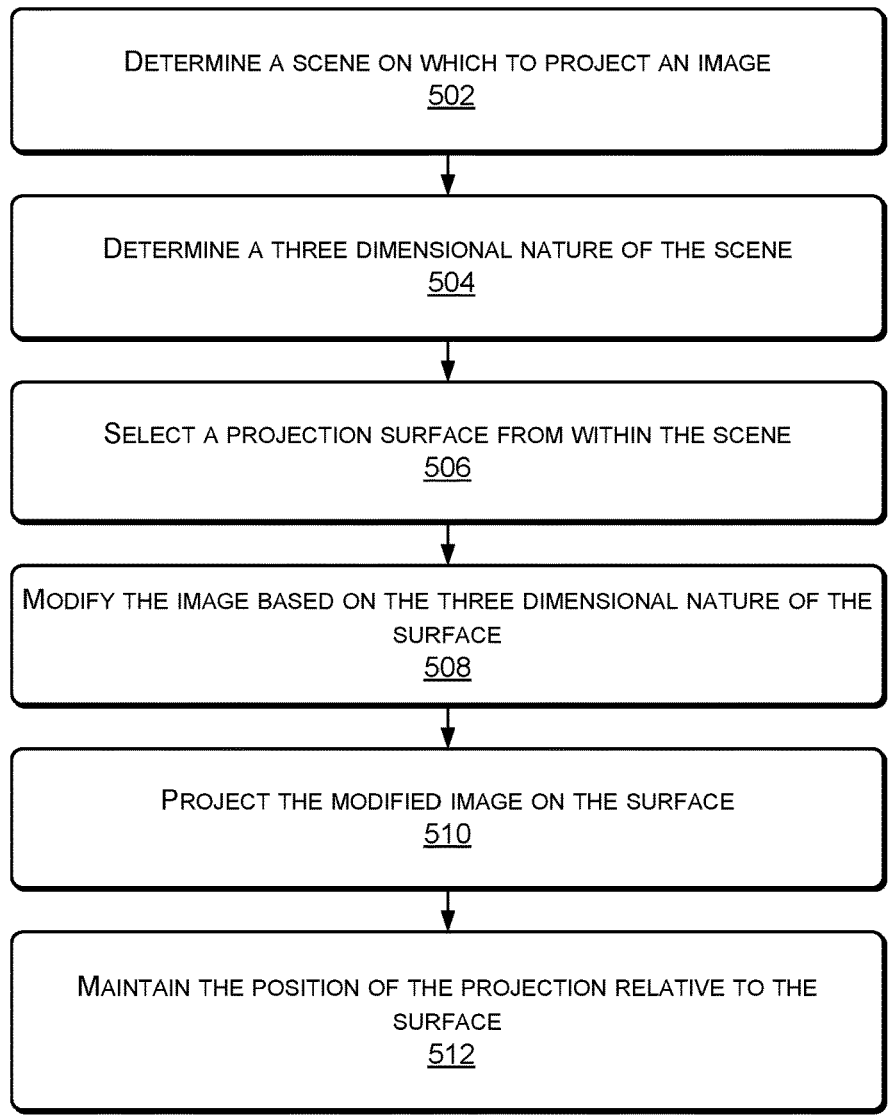
FIG. 5 illustrates an example flow diagram showing an illustrative process for projecting an image on a non-uniform surface.
Figure 6:
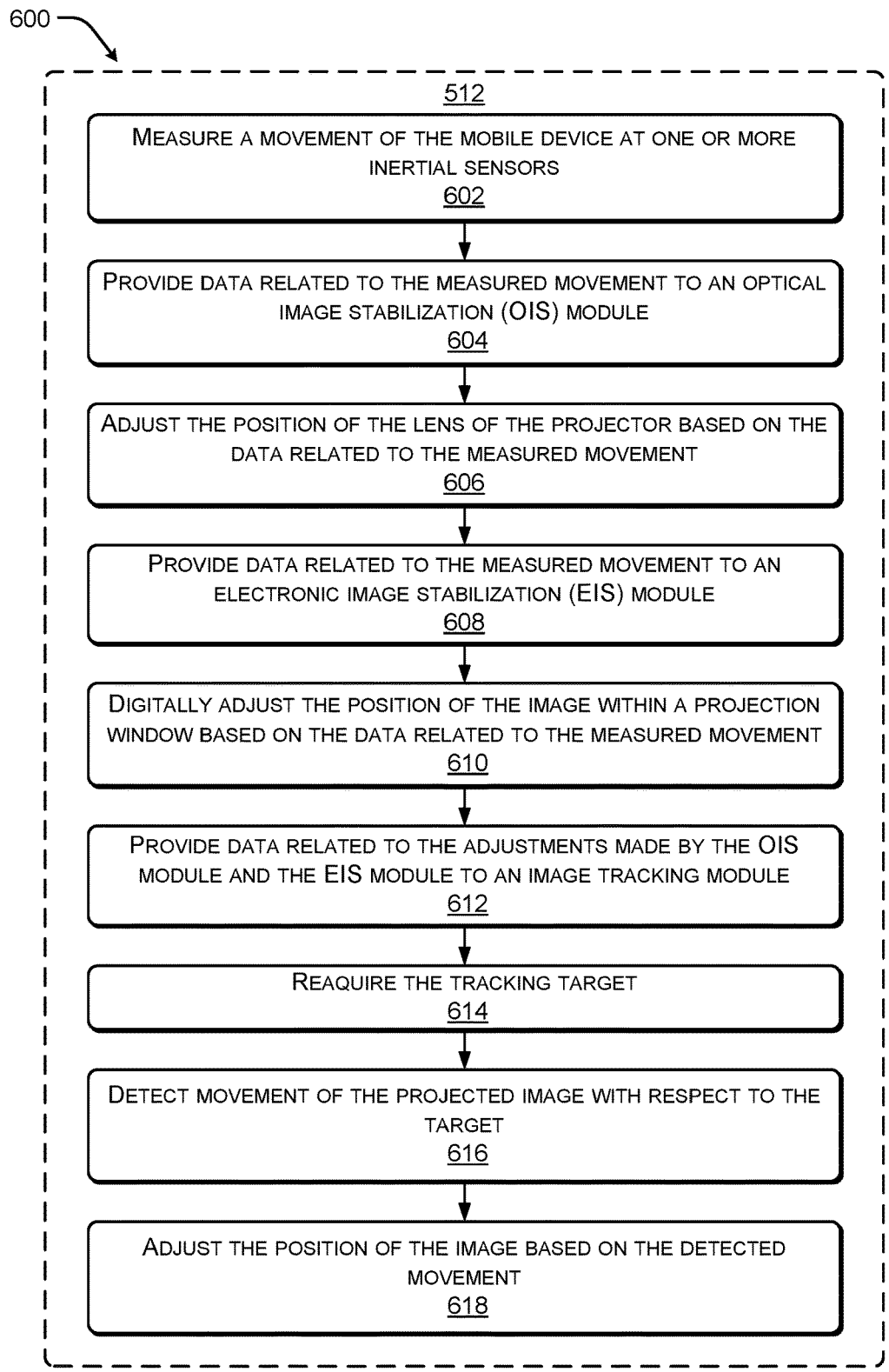
FIG. 6 is an example flow diagram showing an illustrative process to project a stable image from a mobile device.

FIGS. 5 and 6 are flow diagrams illustrating example processes for implementing user a stable projection from a mobile or hand-held device. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 illustrates an example flow diagram showing an illustrative process 500 for projecting an image on a non-uniform surface. At 502, a user of a mobile device determines a scene on which to project an image. For instance, the user may select a wall, a bench, a car or any other object in the user's environment. In some cases, the scene is a surface containing an advertisement, a phone number, a bar code, a street sign, etc. that the user is trying to obtain more information about.

At 504, the mobile device determines a three dimensional nature of the scene. For example, structured light may be utilized to map the depth, orientation and contours of the scene. In this example, a pattern (often a grid or a series of horizontal bars) is projected on the scene. The mobile device is able to determine the depth, orientation and contours of the scene based on the way that the pattern is deformed when striking one or more surface of the scene. In some specific instances, differing or alternating patterns (e.g., horizontal rows and vertical columns) may be alternatively projected on the scene at extremely high frame rates in order to obtain the depth information.

In other examples, the mobile device may be equipped with multiple cameras, such as time-of-flight cameras, stereo cameras, aperture cameras or light field cameras, which together with computer vision technology may be utilized to obtain the three dimensional nature of the scene including depth, orientation and contour information. In one particular example, the mobile device may be configured with a time-of-flight camera, which is designed to resolve distances between the mobile device and a scene based on the known speed of light. The time-of flight cameras are configured to measure the time-of-flight of a light signal as it travels from the mobile device to the one or more surfaces of the scene for each point of the image.

At 506, the mobile device selects a projection surface from within the scene. For example, the user may select the surface using one or more input/output interfaces on the mobile device, such as by tracing a window on a touch-screen display of the mobile device. In other examples, the mobile device may locate the most uniform surface and project onto that surface or the mobile device may select a sub-region within a possible projection window to use as the surface based on, for instance, a desired projection size, distance between the surface and the mobile device, desired image quality, and the technical capabilities of the projectors.

At 508, the mobile device modifies the image to be projected based on the three dimensional nature of the surface. For example, if a first section of the surface is further from the mobile device than a second section of the surface, the mobile device may cause the portion of the image to be projected on the first section to be at a larger scale than the portion of the image to be projected onto the second section, such that the image appears proportionately from the position of the user of the mobile device.

At 510, the mobile device projects the modified image on the surface and, at 512, the mobile device maintains the position of the projection relative to the surface. For example, the mobile device may be equipped with one or more gyroscopes and/or one or more accelerometers, which are able to detect movement of the mobile device and to translate the movement into a signal. An OIS module and/or an EIS module receives the signal and stabilize the image based on the signal. In another example, the mobile device may be equipped with a camera and an image tracking module, which is able to monitor the position of the image with respect to a target and to adjust the projection when movement is detected.

FIG. 6 is an example flow diagram showing an illustrative process 600 to project a stable image from a mobile device. In general, the process 600 is one possible process, which may be performed as part of 512. At 602, a mobile device measures a movement of the mobile device at one or more inertial sensors.

At 604, the mobile device provides the data related to the measured movement to an OIS module. For instance, the OIS module and the inertial sensors may be part of an integrated packet that is incorporated into the projector, such that movements of the mobile device are detected and the position of the projector (or the lens of the projector) is adjusted in response. In other examples, the OIS module may be stored in the computer-readable media and executed by one or more processors in response to an activation or use of the projector and the inertial sensors may be generally included as part of the mobile device for use by one or more applications executing on the mobile device.

At 606, the OIS module causes the mobile device to adjust the position the projector (or of the lens) based on the data related to the measured movement. For instance, several voice coils (or other actuators) may be connected to the projector in an arrangement, such that the OIS module is able to cause the voice coils to actuate in combination to adjust the tilt, pitch and position of the projector with respect to the mobile device (e.g., one voice coil at each corner of the lens). For example, if the mobile device is tilted downward the OIS module may cause the voice coils to adjust the projector with an upward tilt to compensate for the downward tilt applied by the user of the mobile device.

At 608, the mobile device provides the data related to the measured movement to an EIS module. For instance, the EIS module may be stored in the computer-readable media and executed by one or more processors in response to an activation or use of the projector. The EIS module may receive data from one or more gyroscopes and one or more accelerometers as the mobile device moves.

At 610, the EIS module digitally adjusts the position of the image within a projection window based on the data related to the measured movement. For example, the EIS module may cause the projector to project the image within a sub-region of the larger projection area and move the sub-region within the larger projection area in order to counteract the measured movements as detected by the gyroscopes and the accelerometers. In some specific implementations, the OIS module may be configured to compensate for changes in tilt and pitch of the mobile device while the EIS module may be configured to compensate for vertical and horizontal movement of the mobile device.

At 612, the OIS module and/or the EIS module provide data related to adjustments to an image tracking module. In general, the image-tracking module monitors the position of the projected image with respect to a target, such as stationary object in the environment or a particular item within the projected image using a camera. The image-tracking module adjusts the position of the projected image to maintain the relative positions. However, if the mobile device is moved or tilted the target may no longer be within the search area of the camera and the image-tracking module may lose the target. Therefore, in one implementation, the image-tracking module is configured to receive adjustment data from the EIS module and the OIS module corresponding to the movement of the mobile device. In this way, the image-tracking module is able to reposition the search window over the target and does not lose the target due to adjustments made by either the OIS module or the EIS module.

At 614, the image-tracking module reacquires the tracking target. For example, when the search window is adjusted the camera is able to scan the surface and provide captured images to the image tracking module, which may re-identify the target within the images. For instance, because adjustments of the OIS or EIS modules are based on gyroscope and accelerometer data, the projected image may still have moved slightly on the surface.

At 616, the image-tracking module detects movement of the projected image with respect to the target and, at 618, the image-tracking module adjusts the position of the image based on the detected movement. For example, the image-tracking module may be configured to move the sub-region of the image within the larger projection area in a manner similar to that of the EIS module.

FIG. 6, as described above, provides one possible process flow for stabilization of an image projected from a hand-held or mobile device. However, it should be understood, that the OIS module, EIS module and image tracking module may be applied in various orders to achieve image stabilization. For example, the EIS module may adjust the position of the image before the OIS module adjust the position of the lens or the OIS module and the EIS module may work in parallel or substantially simultaneously to maintain the image position. In other examples, the OIS module and EIS module may be used to correct for small movements of the mobile device, such as jitters, while the image tracking module may be used to maintain the position of the image on the surface for larger movements or even for movements of the projection surface itself.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A mobile device comprising:
   at least one camera;
   a projector; and
   a surface selection module configured to identify a projection surface using first data captured by the at least one camera, the first data providing three-dimensional information about one or more areas on the projection surface, wherein the three-dimensional information for an individual area on the projection surface provides a depth, an orientation, and a contour for the individual area.

2. The mobile device as recited in claim 1, further comprising one or more actuators configured to adjust a first alignment of the projector.

3. The mobile device as recited in claim 2, wherein the one or more actuators are coupled to a lens of the projector, and the one or more actuators are configured to adjust a second alignment of the lens.

4. The mobile device as recited in claim 1, further comprising an image rendering module implemented in software.

5. The mobile device as recited in claim 1, further comprising an optical image stabilization module.

6. A method comprising:
   under control of a mobile device configured with executable instructions,
      emitting a pattern of light onto a projection surface within a scene;
      determining one or more deformations of the pattern of light emitted onto the projection surface; and
      generating, based at least in part on the one or more deformations of the pattern of light emitted onto the projection surface, three-dimensional data for one or more areas on the projection surface, wherein the three-dimensional data for an individual area of the one or more areas provides a depth of the individual area.

7. The method as recited in claim 6, wherein the three-dimensional data for the individual area further provides an orientation and a contour for the individual area.

8. The method as recited in claim 6, further comprising generating a three-dimensional map of the projection surface.

9. The method as recited in claim 6, further comprising:
selecting a portion of the projection surface using the three-dimensional data;
modifying an image using the three-dimensional data to cause the image to appear undistorted on the portion of the projection surface; and
projecting the image onto the portion of an area of the projection surface.

10. The method as recited in claim 9, further comprising:
receiving data related to a movement of the mobile device from an inertial sensor associated with the mobile device; and
adjusting a position of the image using an optical image stabilization module, wherein the optical image stabilization module causes one or more actuators to adjust a first position of a projector of the mobile device.

11. The method as recited in claim 10, wherein the one or more actuators adjust a second position of a lens of the projector.

12. The method as recited in claim 9, further comprising:
tracking a relative position of the image on the projection surface;
detecting a change in the relative position; and
adjusting a position of the image to maintain the relative position of the image on the projection surface.

13. The method as recited in claim 6, further comprising:
identifying a target in the scene; and
capturing an image that includes information about the target.

14. One or more non-transitory computer-readable media having computer-executable instructions that, when executed by one or more processors, cause the one or more processors to perform operations comprising:
projecting a pattern of light onto a scene;
determining a deformation of the pattern of light; and
obtaining, based at least in part on the deformation of the pattern of light, three-dimensional data for one or more areas on a surface located within the scene, wherein the three-dimensional data for an individual area of the one or more areas provides a depth of the individual area.

15. The one or more non-transitory computer-readable media as recited in claim 14, wherein the three-dimensional data for the individual area provides an orientation and a contour for the individual area.

16. The one or more non-transitory computer-readable media as recited in claim 14, the operations further comprising generating, based at least in part on the three-dimensional data, a three-dimensional map of the surface.

17. The one or more non-transitory computer-readable media as recited in claim 14, wherein the pattern of light is a first pattern of light and the operations further comprising projecting a second pattern of light onto the scene.

18. The one or more non-transitory computer-readable media as recited in claim 14, the operations further comprising:
selecting a portion of a projection surface using the three-dimensional data;
modifying an image using the three-dimensional data to cause the image to appear undistorted on the portion of the projection surface; and
projecting the image onto the portion of the projection surface.

19. The one or more non-transitory computer-readable media as recited in claim 18, the operations further comprising:
capturing data related to a movement of a projector projecting the image;
determining an adjustment to apply to the image based at least in part on the data related to the movement; and
modulating the image based at least in part on the adjustment to maintain a location of the image on the projection surface, the modulating including adjusting a position of the image within a virtual projection window.

20. The one or more non-transitory computer-readable media as recited in claim 19, the operations further comprising:
tracking the location of the image on the projection surface;
detecting a change in the location of the image in the projection surface; and
modulating the image in response to the change, the modulating including adjusting the position of the image within the virtual projection window in a substantially opposite direction of the change to maintain the location of the image on the projection surface.

* * * * *